April 5, 1938.  A. E. HOOK  2,112,897
BELT LOOP
Filed Nov. 18, 1935
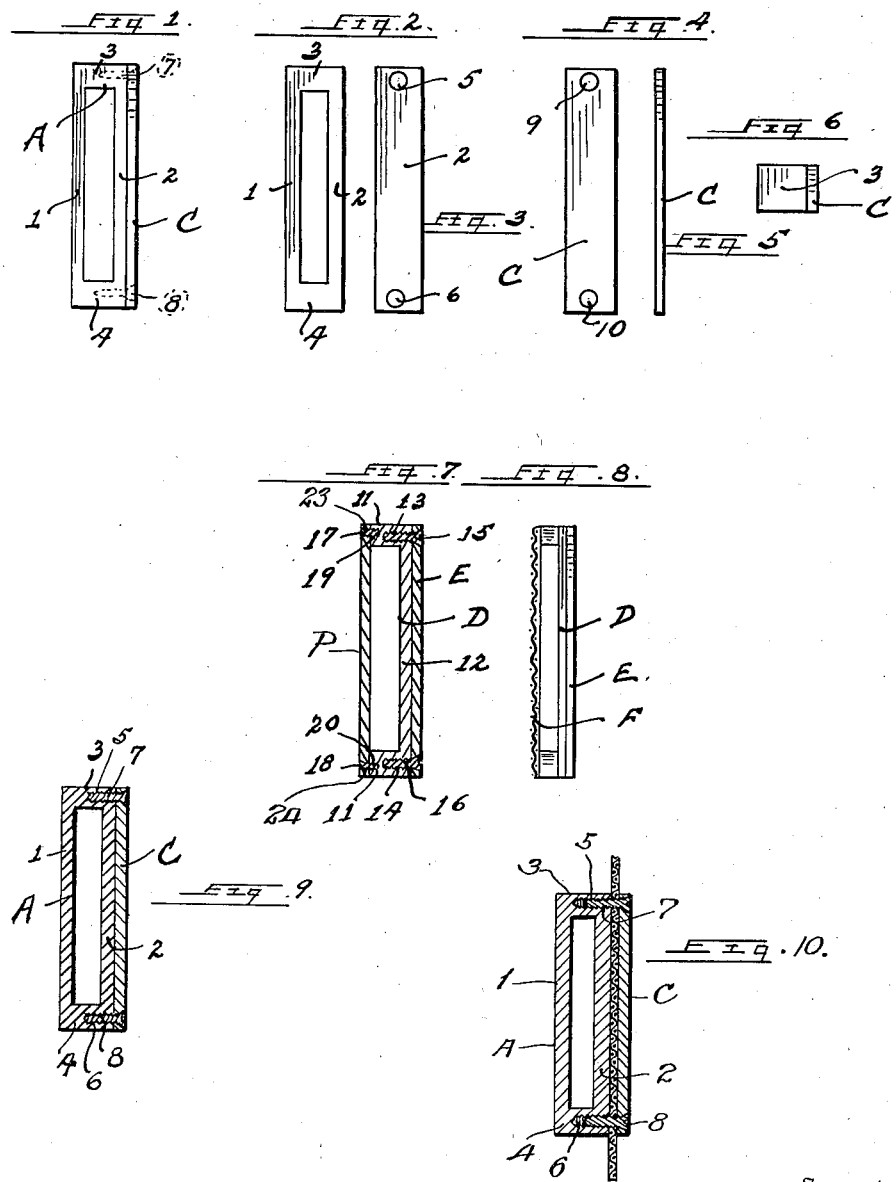
Inventor
A. E. Hook
By R. M. Thomas
Attorney Patented Apr. 5, 1938

2,112,897

UNITED STATES PATENT OFFICE 2,112,897

BELT LOOP

Arthur E. Hook, Fort Hall, Idaho

Application November 18, 1935, Serial No. 50,326

2 Claims. (Cl. 241—11)

My invention relates to belt loops and the like and has for its object to provide a new and efficient emergency belt loop to be attached to or used on a belt, strap, or trousers.

A further object is to provide an emergency belt loop to be used on a belt in case the original loop has been broken or lost or in case an extra loop is required.

A still further object is to provide a loop for belts or trousers which may be made of metal or similar material and which may be or may not be covered or faced with a fabric face to match the material on which it is being used whether it be fabric, leather, or other materials.

These objects I accomplish with the device illustrated in the accompanying drawing in which similar numerals and letters of reference indicate like parts throughout the several views and as described in the specification forming a part of this application and pointed out in the appended claims.

In the drawing in which I have shown the best and most preferred manner of building my invention Figure 1 is a side elevation thereof.
Figure 2 is a side elevation of the main loop.
Figure 3 is a front view of Figure 2.
Figure 4 is a side elevation of the securing clamp plate.
Figure 5 is an edge view of Figure 4.
Figure 6 is an end view of Figure 1.
Figure 7 is a vertical longitudinal section of a modified type of loop with the front face removable.
Figure 8 is a side elevation of the device with a front face of fabric.
Figure 9 is a vertical section of Figure 1.
Figure 10 is a view of the device attached to any fabric.

In the drawing I have shown my loop as A, having a front face 1, and back side 2, spaced therefrom and joined by integral ends 3 and 4. The back side 2 of the loop A is provided with threaded holes 5 and 6 at or near each end thereof extending into the ends 3 and 4 and with screws or bolts 7 and 8 to be screwed thereinto.

The securing plate C is made flat to fit the back side 2 and provided with aligned holes 9 and 10 to align with the holes 5 and 6 and the screws 7 and 8 are passed through the holes 9 and 10 of the securing plate C and then into the holes 5 and 6 at each end of the loop A securing the plate to the body.

In Figure 7 of the drawing I have shown a modified form of the device in which the body D is made of a U-shaped back 12 having the two legs 11 provided with threaded holes 13 and 14 to receive screws 15 and 16 which secure a back plate E to the body. This plate E is provided with holes in each end to align with the holes 13 and 14 when securing the plate to the body.

A front plate P may be made of ivory, fancy carved, or silver, or mother of pearl, or any other like fancy material or plain material desired and is secured to the legs 11 by passing screws 17 and 18 through holes 23 and 24 in said plate P and into aligned threaded holes 19 and 20 in the legs 11. The holes 22 and 23 are bored through the plate P near each end thereof in alignment with the holes 19 and 20 of the body D.

In Figure 8 I have shown the use of a fabric cover F for the belt loop made identical with that shown in Figure 7.

It will be obvious that many different faces or face plates may be made to change the appearance of the belt loop for various uses and such modifications and changes may be made in the device without departing from the spirit of the invention or the scope of the claims.

The use of the device is as follows: When it is desired to replace a broken belt loop on the top end of trousers or any other place where a loop is used to hold a belt in place, the plate C is removed from the body A and the body A is set to the fabric of the trousers wherever desired; the plate C is then placed on the opposite side of the fabric and the screws 7 and 8 screwed into the socket or holes 5 and 6 securing the loop of the body A on the outside of the fabric. If a loop is broken from a belt, the belt is secured between the plate C and the body A with the body outside to receive the belt wherever desired.

In Figure 10, I have shown the use of the belt loop when secured to a fabric such as the fabric of a pair of trousers.

Having thus described my invention I desire to secure by Letters Patent and claim:

1. In a belt loop of the class described, the combination of a body formed of back, face, and ends, with the ends spacing the back from the face; a securing plate of the same shape as the back of the body with holes through said securing plate in alignment with holes in the ends of the body; and screws to be inserted through the holes in the securing plate, through the fabric to which the loop is to be attached and into the holes in the ends of the body of the loop to secure the loop in position.

2. A belt loop of the class described comprising a U-shaped body, a face plate adapted to be removably attached to the ends of said body to form a loop, holes formed in the back face of the U-shaped body at the ends thereof; a securing plate of substantially the same size as the back of the body having holes in the ends thereof aligned with the holes in the body; and fastening members adapted to secure the securing plate and the body together with the fabric of the garment therebetween.

ARTHUR E. HOOK.